United States Patent [19]
Leone et al.

[11] Patent Number: 5,598,930
[45] Date of Patent: Feb. 4, 1997

[54] SHALE SHAKER SCREEN

[75] Inventors: Vincent D. Leone, Houston, Tex.; Jeffrey E. Walker, Lafayette, La.; Charles N. Grichar; Kenneth W. Seyffert, both of Houston, Tex.; Guy L. McClung, III, Spring, Tex.

[73] Assignee: Advanced Wirecloth, Inc., New Iberia, La.

[21] Appl. No.: 504,495

[22] Filed: Jul. 20, 1995

[51] Int. Cl.⁶ .................................................. B07B 1/49
[52] U.S. Cl. .......................... 209/403; 209/405; 209/412
[58] Field of Search ................................... 209/400, 399, 209/403, 405, 412

[56] References Cited

U.S. PATENT DOCUMENTS

| | | |
|---|---|---|
| H1481 | 9/1995 | Ray ............................................ 428/98 |
| 40,242 | 10/1863 | Capell . |
| 236,416 | 1/1881 | Bourne . |
| 246,144 | 8/1881 | Keeler . |
| 268,491 | 12/1882 | Hubbell . |
| 275,190 | 4/1883 | Gilbert . |
| 500,302 | 6/1893 | Stoecket et al. . |
| 526,562 | 9/1894 | Cross . |
| 560,858 | 5/1896 | Missroon . |
| 607,598 | 7/1898 | Closz . |
| 865,185 | 9/1907 | Kerrigan . |
| 948,222 | 2/1910 | Honabach . |
| 984,866 | 2/1911 | Tate . |
| 1,098,979 | 6/1914 | Schuhard . |
| 1,344,747 | 6/1920 | Wright . |
| 1,462,804 | 7/1923 | Evans . |
| 1,505,735 | 8/1924 | Stebbins . |
| 1,561,632 | 11/1925 | Woodward . |
| 1,679,941 | 7/1928 | Helman . |
| 1,785,195 | 12/1930 | Hoes et al. . |
| 1,879,377 | 9/1932 | McNeely . |
| 1,950,861 | 3/1934 | O'Toole, Sr. . |
| 1,997,713 | 4/1935 | Boehm . |
| 1,997,740 | 4/1935 | Nickerson . |
| 2,082,513 | 6/1937 | Roberts . |
| 2,089,548 | 8/1937 | Frantz et al. . |
| 2,190,262 | 2/1940 | Geist . |
| 2,274,700 | 3/1942 | Jenks . |
| 2,406,051 | 8/1946 | Weiss . |
| 2,462,878 | 3/1949 | Logue . |
| 2,648,441 | 8/1953 | Soldan . |
| 2,723,032 | 11/1955 | Gisler et al. . |
| 2,726,184 | 12/1955 | Cox et al. . |
| 2,827,169 | 3/1958 | Cusi . |
| 2,902,165 | 9/1959 | Imershein . |
| 2,929,464 | 3/1960 | Sprouse . |

(List continued on next page.)

FOREIGN PATENT DOCUMENTS

| | | |
|---|---|---|
| 59-142818 | 8/1984 | Japan . |
| 519680 | 4/1940 | United Kingdom . |
| 823648 | 11/1959 | United Kingdom . |
| 1412975 | 11/1975 | United Kingdom . |
| 2124099 | 2/1984 | United Kingdom . |
| 2161715 | 1/1986 | United Kingdom . |

OTHER PUBLICATIONS

"Derrick Sandwich Shaker," Derrick Equipment Co. (no date).
"The Future of Fine Screening," Derrick Equipment Co. Apr. 1993.
"Derrick Pyramid Screens," Derrick Corp. (No date).
"Advanced Wirecloth, Inc.," Advanced Wirecloth, Inc., Jan. 1993.
"CPI Group, Inc.," Group, Inc., Jan. 1990.
"LM3 Full–Flo ™ Shale Shaker," Sweco Oilfield Services, Jan. 1991.

*Primary Examiner*—D. Glenn Dayoan
*Attorney, Agent, or Firm*—Guy McClung

[57] ABSTRACT

A screen for a shale shaker has screening material between opposed frame sides and one or more lower strips beneath the screen. In one aspect a plurality of lower strips are bonded to the screen and extend across the screen from one frame side to the other. In one aspect the screen is undulating screening material and lower portions of the screening material are bonded to the strips.

19 Claims, 13 Drawing Sheets

U.S. PATENT DOCUMENTS

| | | | |
|---|---|---|---|
| 2,980,208 | 4/1961 | Neumann . | |
| 3,057,481 | 10/1962 | Pale | 210/493 |
| 3,165,473 | 1/1965 | Pall et al. | 210/510 |
| 3,243,943 | 4/1966 | Getzin | 55/499 |
| 3,255,885 | 6/1966 | Burls | 209/314 |
| 3,458,978 | 8/1969 | Davis | 55/499 |
| 3,465,413 | 9/1969 | Rosaen et al. | 29/428 |
| 3,542,636 | 11/1970 | Wandel | 161/114 |
| 3,574,103 | 4/1971 | Latkin | 428/72 |
| 3,655,060 | 4/1972 | Hagdahl | 210/493 |
| 3,679,057 | 7/1972 | Perez | 210/223 |
| 3,716,138 | 2/1973 | Lumsden | 209/401 |
| 3,747,770 | 7/1973 | Zentis | 210/402 |
| 3,747,772 | 7/1973 | Brown | 210/493 |
| 3,789,498 | 2/1974 | Cole | 29/470.9 |
| 3,793,692 | 2/1974 | Tate et al. | 29/163.5 |
| 3,853,529 | 12/1974 | Boothe et al. | 55/499 |
| 4,019,987 | 4/1977 | Krashow | 210/232 |
| 4,022,596 | 5/1977 | Pedersen | 55/528 |
| 4,033,865 | 7/1977 | Derrick, Jr. | 209/275 |
| 4,062,769 | 12/1977 | Simonson | 209/399 |
| 4,075,106 | 2/1978 | Yamazaki | 210/487 |
| 4,138,303 | 2/1979 | Taylor | 156/264 |
| 4,380,494 | 4/1983 | Wilson | 209/319 |
| 4,410,427 | 10/1983 | Wydeven | 210/317 |
| 4,464,242 | 8/1984 | Boulton | 204/253 |
| 4,472,473 | 9/1984 | Davis et al. | 428/184 |
| 4,575,421 | 3/1986 | Derrick et al. | 209/397 |
| 4,589,983 | 5/1986 | Wydevan | 210/317 |
| 4,617,122 | 10/1986 | Kruse et al. | 210/493.3 |
| 4,678,578 | 7/1987 | Nodes et al. | 210/445 |
| 4,696,751 | 9/1987 | Eifling | 210/780 |
| 4,728,422 | 3/1988 | Bailey | 210/314 |
| 4,769,968 | 9/1988 | Davis et al. | 52/814 |
| 4,820,407 | 4/1989 | Lilie | 209/397 |
| 4,832,834 | 5/1989 | Baird, Jr. | 209/397 |
| 4,882,054 | 11/1989 | Derrick et al. | 210/389 |
| 5,028,474 | 7/1991 | Czaplicki | 428/178 |
| 5,084,178 | 1/1992 | Miller et al. | 210/493.5 |
| 5,162,143 | 11/1992 | Porter et al. | 428/179 |
| 5,211,291 | 5/1993 | Kelley et al. | 209/680 |
| 5,221,008 | 6/1993 | Derrick, Jr. et al. | 209/269 |
| 5,256,292 | 10/1993 | Cagle | 210/499 |
| 5,312,508 | 5/1994 | Chisholm | 156/292 |
| 5,330,057 | 7/1994 | Schiller et al. | 209/392 |
| 5,385,669 | 1/1995 | Leone, Sr. | 210/488 |
| 5,392,925 | 2/1995 | Seyffert | 209/405 |
| 5,417,793 | 5/1995 | Bakula | 156/308.2 |
| 5,417,858 | 5/1995 | Derrick et al. | 210/388 |
| 5,417,859 | 5/1995 | Bakula | 210/388 |
| 5,490,598 | 2/1996 | Adams | 209/403 X |

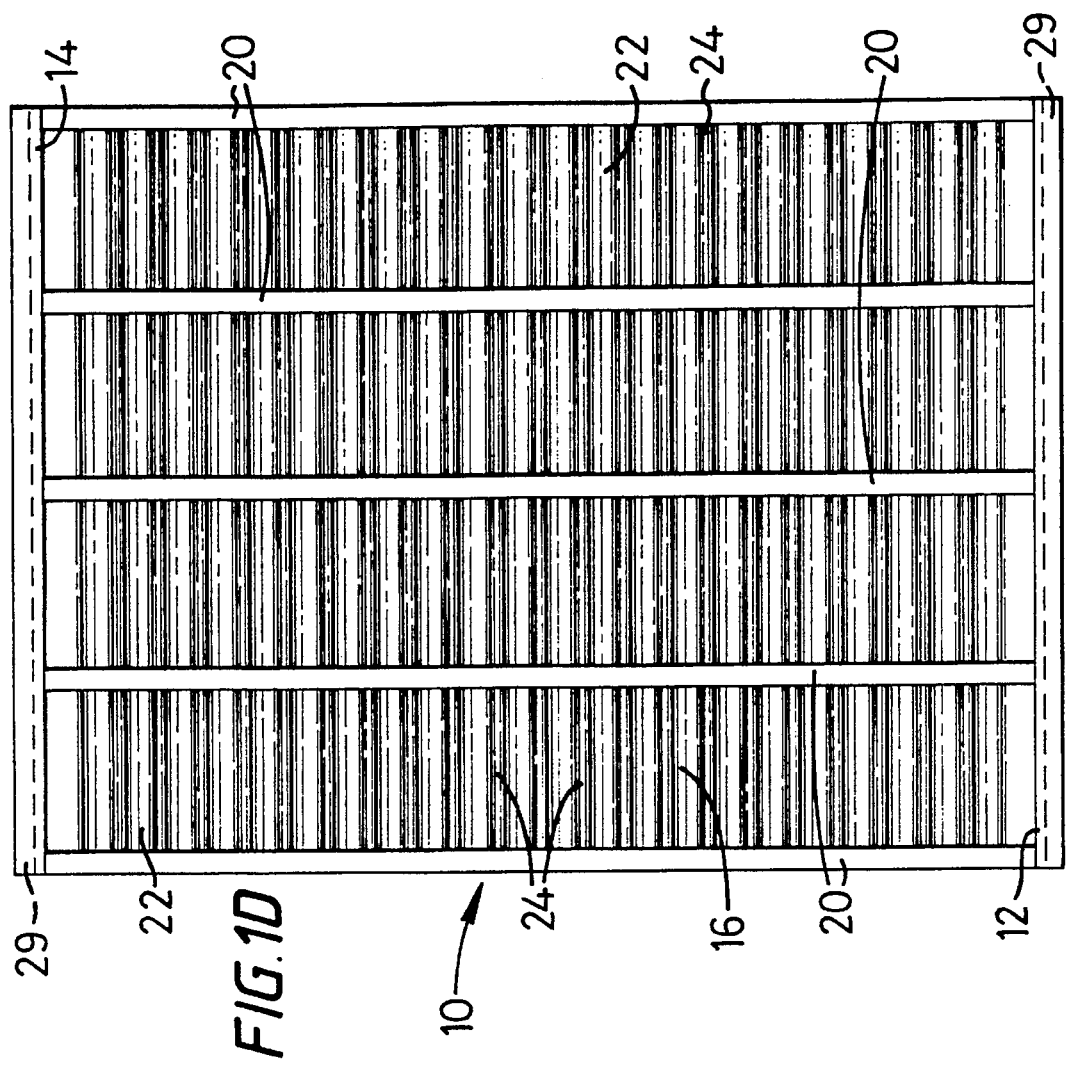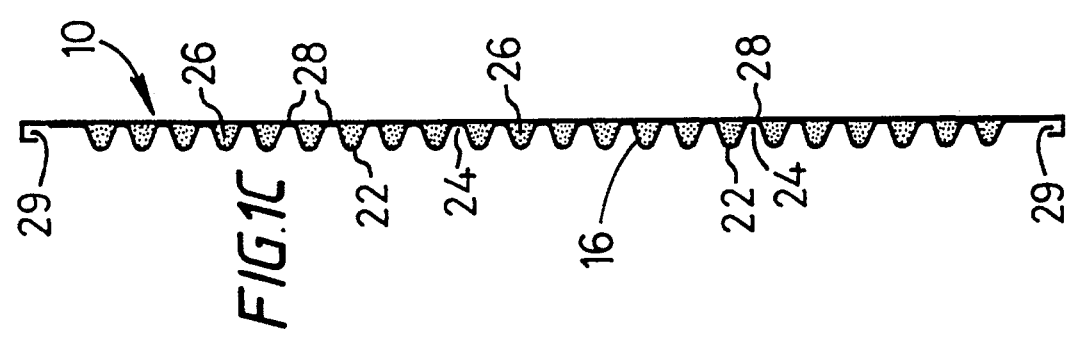

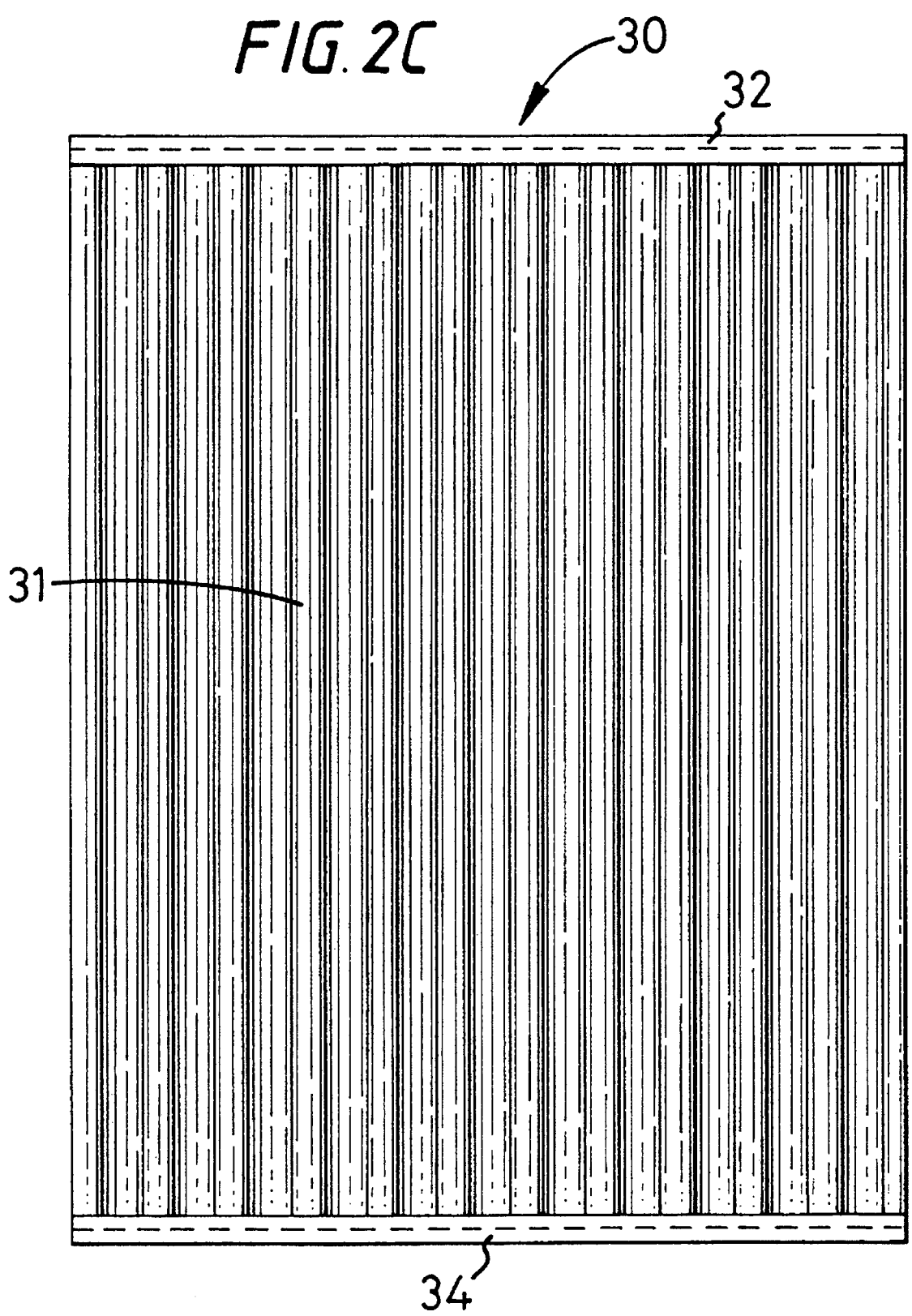

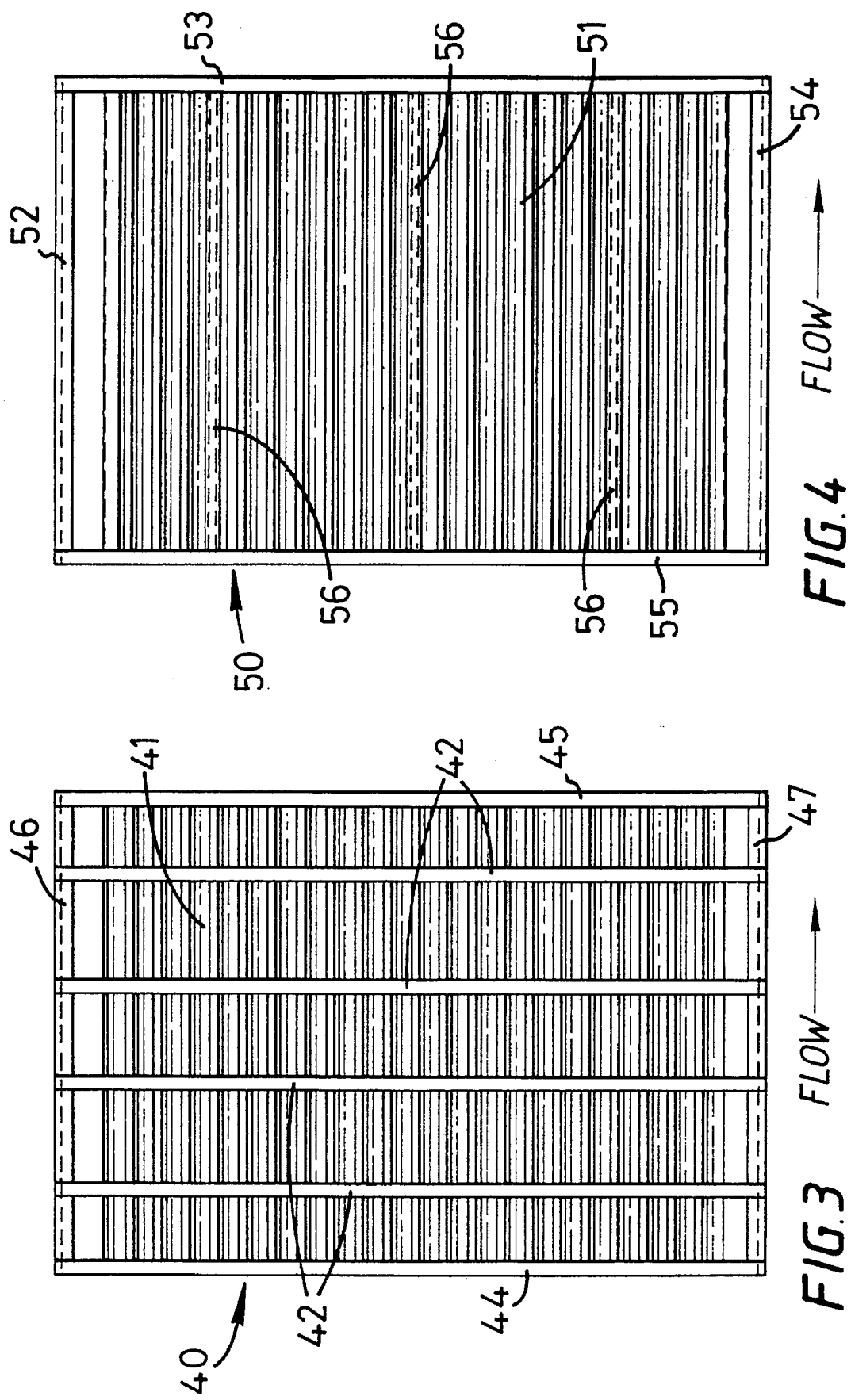

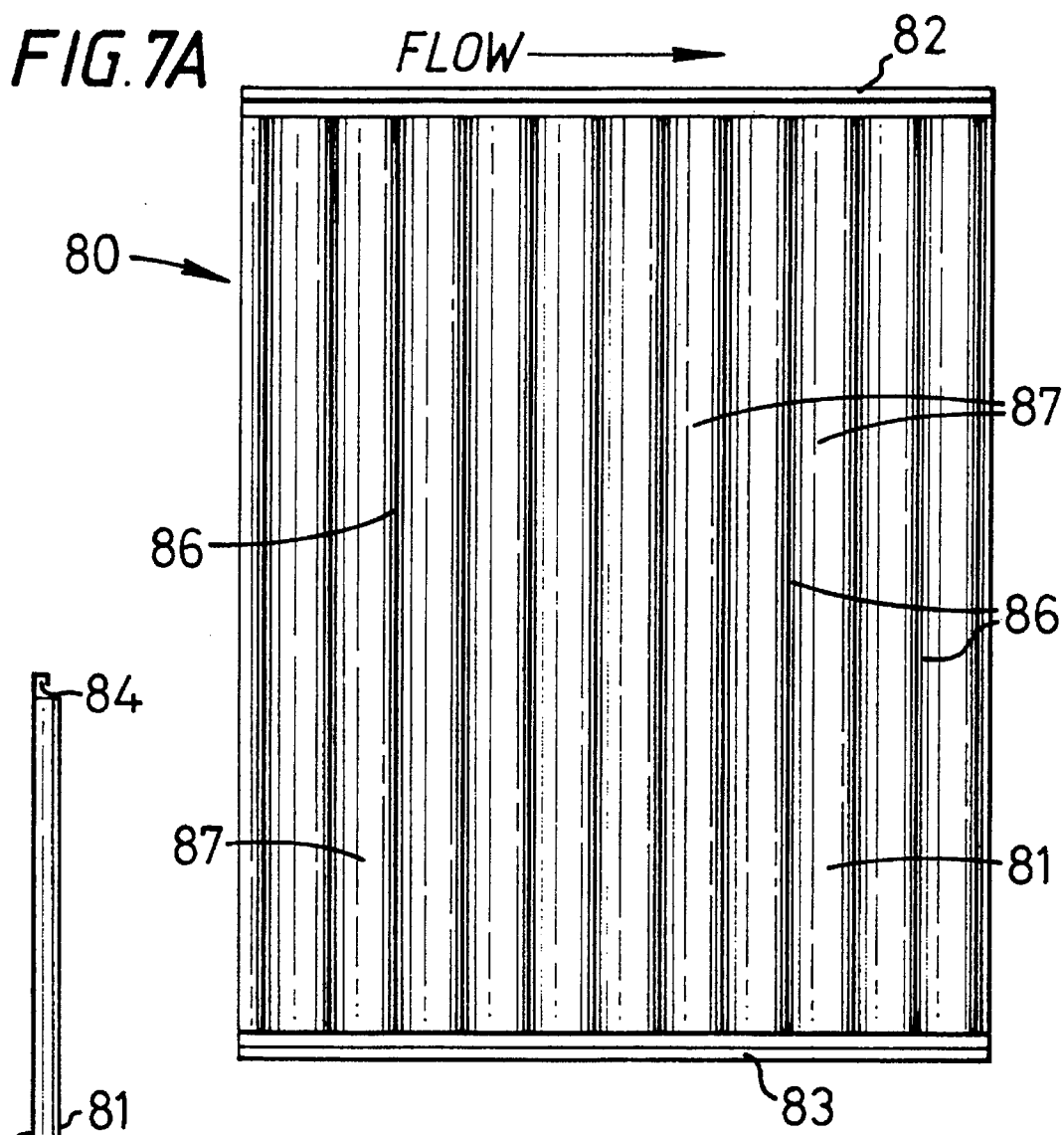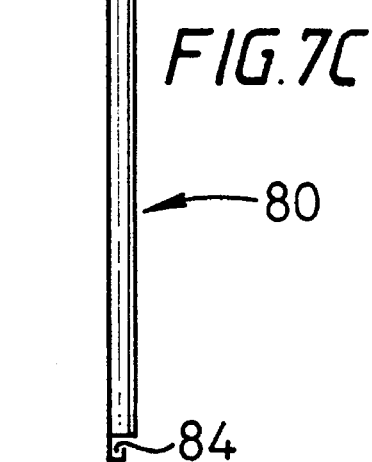

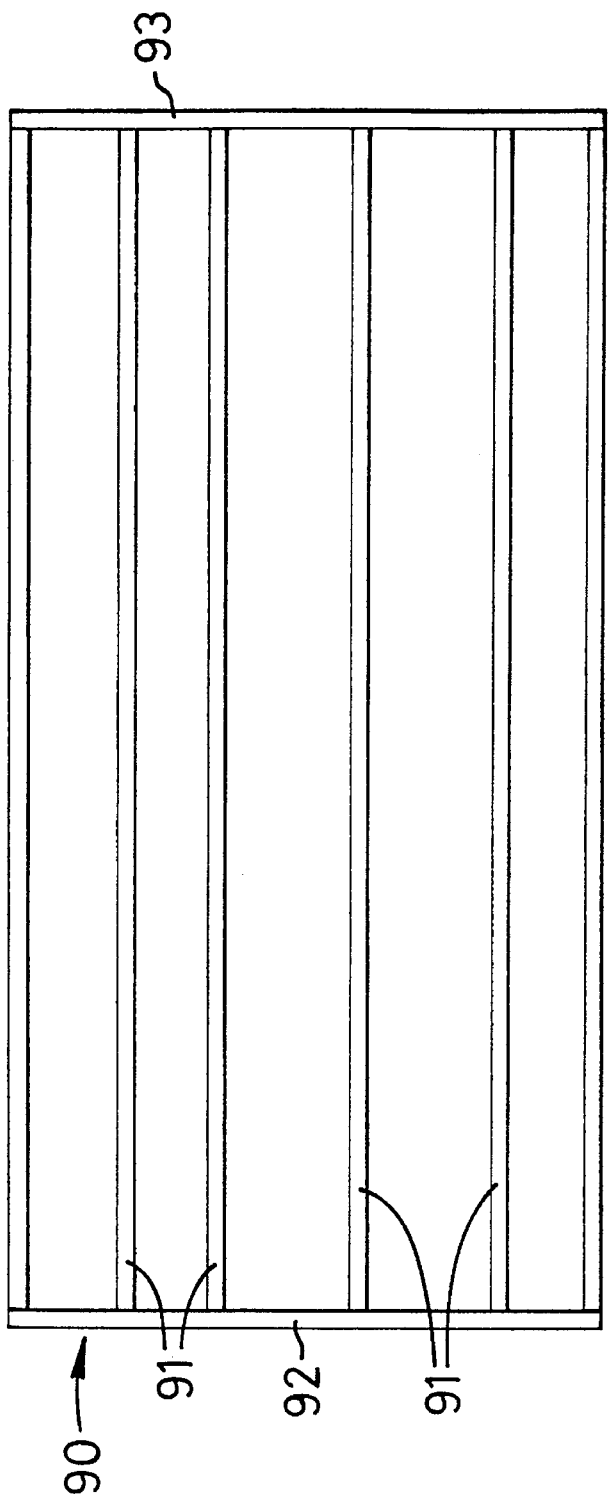
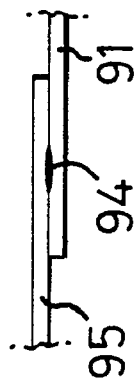
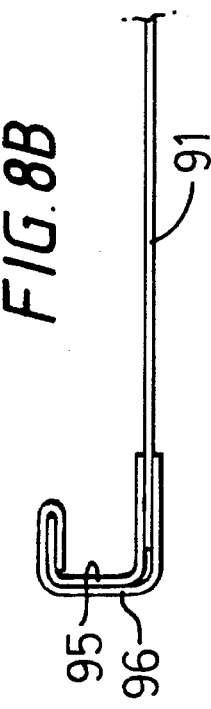

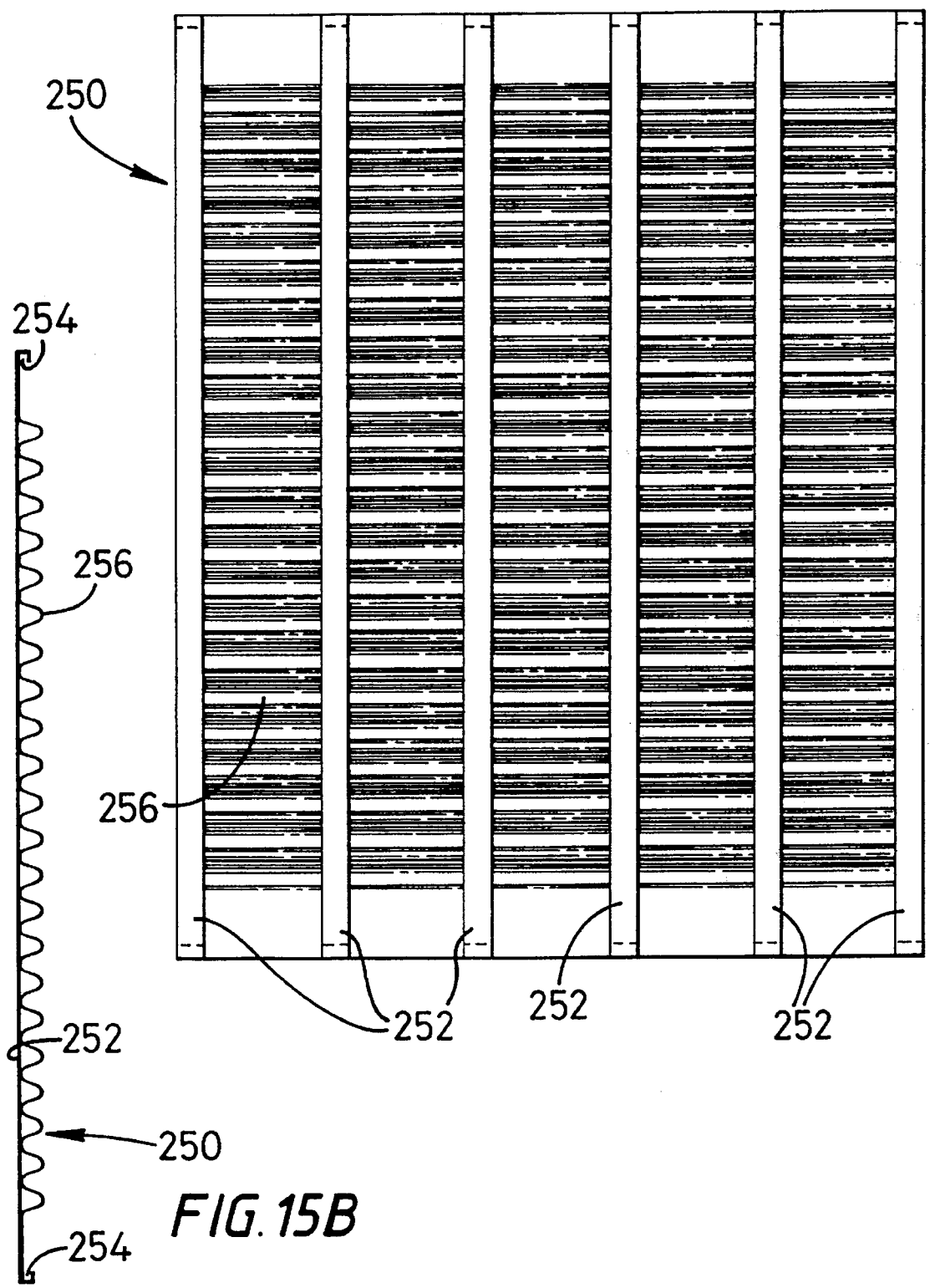

SHALE SHAKER SCREEN

BACKGROUND OF THE INVENTION

1. Field Of The Invention

The present invention is directed to vibratory screens, to filtering screens, to such screens that are generally flat or that are not flat, to devices with such screens, and to shale shakers with such screens.

2. Description of Related Art

The need for solids control in drilling mud used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drillbit. The mud picks up cuttings (rock) and other solids from the well and carries them upwardly away from the bit and out of the well in a space between the well walls and the drill string. At the top of the well, the solids-laden mud is discharged over a shale shaker, a device which typically has a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

In some shale shakers a fine screen cloth is used with the vibrating screen. The screen may have two or more overlying layers of screen cloth. The prior art discloses that the layers may be bonded together; and that a support, supports, or a perforated or apertured plate may be used beneath the screen or screens. The frame of the vibrating screen is resiliently suspended or mounted upon a support and is caused to vibrate by a vibrating mechanism, e.g. an unbalanced weight on a rotating shaft connected to the frame. Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

Many screens used with shale shakers are flat or nearly flat (i.e. substantially two-dimensional). Other screens, due to corrugated, depressed, or raised surfaces are three-dimensional. U.S. Pat. Nos. 5,417,793; 5,417,858; and 5,417,859 disclose non-flat screens for use with shale shakers. These screens have a lower planar apertured plate with a multiplicity of spaced-apart apertures or openings therethrough. Undersides of troughs of undulating screening material are bonded to the apertured plate. Such screens present a variety of problems, deficiencies, and disadvantages, including: decreased flow area due to area occluded by solid parts of the apertured plate; necessity to either purchase relatively expensive apertured plate or provide for in-house perforating of a solid plate; plate weight increases wear on parts such as rubber screen supports or cushions and can inhibit required vibration; large plate surface area requires relatively large amount of bonding means for bonding screens to the plate; and a finished screen which is relatively heavy increases handling problems, hazards, and cost of shipping.

There is a need for a supported (either non-flat or flat) screen which is consumable, efficient and cost-effective, yet readily and inexpensively made, easy to handle, and relatively inexpensive to transport.

SUMMARY OF THE PRESENT INVENTION

The present invention discloses, in certain embodiments, a screen for vibrating screen apparatus. The screen has one or more upper layers of screen, screen cloth, and/or mesh. If more than one layer is used, they may be bonded together at discrete points, at discrete areas, or over their entire surface. The layer or layers are mounted on frame apparatus which may include a solid side support on each of two spaced apart sides of the layer(s), or may include a full four sided screen frame. A strip or strips of support material (e.g. flat steel, aluminum or plastic strips—of any width, but in certain preferred embodiments ranging between a half inch to three inches in width; and of any thickness, but in certain preferred embodiments ranging between one-thirty second and one-eighth inches thick, or rods of these materials with a diameter between one-thirty second and one-eighth inches; any screen may use strips made from different materials, e.g. cross-strips of plastic and end strips of steel, or vice versa) are secured across two or more frame sides. With respect to a two sided frame wherein the two sides are parallel and spaced apart, a strip or strips may be, according to this invention, disposed parallel to the two sides; and, if more than one strip is used, spaced apart across the area of the layer or layers. It is also within the scope of this invention to use a strip or strips which are disposed in a manner non-parallel to the two sides. In one aspect such non-parallel strips may extend diagonally from one end of one side of the frame, across the layer or layers, to a diagonally opposite end of the other side. In another aspect such a strip may extend from any point of a frame side to any point on a non-framed side of the layer or layers. Any such strip (or rod) may be bonded, sintered, welded or otherwise secured (herein refered to collectively as "bonded") at any point to the layer or layers; at substantially every point of contact between the strip(s) and the layer(s); or at selected intermediate contact points.

In certain embodiments such a strip (or strips) is used with an undulating three-dimensional layer or layers of screen, screen cloth, screen mesh, or some combination thereof (either non-bonded layers or bonded layers if multiple layers are present). If the undulating layer(s) present certain downwardly projecting areas, e.g. troughs between valleys, some or all of the troughs may, within the scope of this invention, be bonded to the strip(s) or portions thereof, and all or only a portion of a trough may be bonded to the strip(s).

Certain prior art shaker screens have a frame side with an in-turned edge which facilitates hooking of the screen, e.g. to a vibrating basket. In one embodiment of the present invention a strip as described above extending between two frame sides also extends into and becomes this in-turned hooked edge. In another aspect a strip is secured to a portion of a hook. To inhibit or prevent fluid leakage at the hook/strip interface, a steel strip may be welded to a metal hook (or a non-metal strip may be bonded to a metal or non-metal hook). In one aspect typical frame sides are not used and only a series of strips with hook edges support the screening material and provide for its mounting to a shale shaker.

In other embodiments in which two frame sides are used, support strips at opposite ends of the frame sides may also serve as end members across the layer(s) ends which do not have frame sides. In one aspect such strips are emplaced at the leading and trailing edges of the layers.

In embodiments of this invention in which the layer (or layers) are non-flat (e.g. undulating) and there is some sort of extended depressed or lower areas on or across the layers which provide a generally lower path for fluid moving on part of or all the way across a screen, the strip or strips according to this invention may be placed beneath the layer or layers at any desired angle to the direction of flow of the fluid across the screen. Also, in those cases in which the entire screen surface has undulations in a same general direction, the screen may be disposed so that fluid flows across the screen either generally in the same direction as the undulations or transverse to such a direction. In either case, a strip or strips beneath the layer(s) may be in the direction of flow or transverse to it.

In one aspect the strips (or rods) described above have one or more projecting portions formed integrally thereof or secured thereto which project into troughs or areas of the layer(s). Such projecting portions may be shaped and configured to mate with the shape of a hill, valley, trough or indented area; may be bonded to the layer(s) at such areas; may be bonded only to the sides of such areas and not to the uppermost portion of a top portion thereof; or may be adjacent such areas without bonding thereto. If there is a series of parallel troughs or a plurality of adjacent indented areas, such projections may be provided in all such troughs or areas; in only on such trough or area; in troughs or areas only adjacent frame sides; or in only middle troughs or areas. It is within the scope of this invention in embodiments in which the screen has a series of parallel troughs, to use alternating flat strips and strips with one or more projections as described above. It is also within the scope of this invention to use non-flat strips which have a shape that corresponds to the series of troughs, e.g. with undulating layer(s), a corresponding undulating strip is used. Such strips may be used instead of or in combination with flat strips as previously described. Any strip herein may have holes through it to facilitate fluid flow. In one aspect any strip, combination of strips, or pattern of strips disclosed herein may be used with a generally flat ("two-dimensional") screen. In any screen disclosed herein the screening material may be sintered to itself, individual screen wires may be sintered to each other, one or more layers of screen material, cloth, mesh, or screen may be sintered to each other; and any screen material may be sintered to any strip disclosed herein, either entirely along its length or at selected points or areas therealong.

The present invention, in one embodiment includes a shale shaker with a frame; a "basket" or screen mounting apparatus; one or more screens as described above and below; and basket vibrating apparatus.

It is within the scope of this invention to provide a screen as disclosed in U.S. Pat. Nos. 5,417,793; 5,417 858; and 5,417,859, but to delete the apertured plate required by these patents and to use instead a coarse mesh or a coarse flexible mesh. In certain preferred embodiments this mesh ranges in size between a 1 mesh to a 3 mesh, with a 2 mesh used in one particular embodiment. It is within the scope of this invention to use any strip, combination of strips, or pattern of strips in place of the apertured plate required by the three listed patents. It is within the scope of this invention to use any strip or strips disclosed herein in combination with the apertured plate required by the three listed patents.

It is, therefore, an object of at least certain preferred embodiments of the present invention to provide:

New, useful, unique, efficient, non-obvious screens, filtering screens, two- or three-dimensional screens; mountings for them; such screens with one or more bottom support strips or rods; and shale shakers with such items;

Such screens which overcome the problems, limitations and disadvantages of screens with lower apertured plates;

Such a screen for a shale shaker with one or more bottom support strips; such a screen also with one or more strip or rod projections for projecting above a bottom strip or apertured plate into an indentation or raised part in an upper screen layer or layers; and A shale shaker with one or more such screens.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1C is an end view of the screen of FIG. 1A.

FIG. 1D is a bottom view of the screen of FIG. 1A.

FIG. 2C is a bottom view of the screen of FIG. 2A.

FIG. 3 is a bottom view of a screen according to the present invention.

FIG. 4 is a bottom view of a screen according to the present invention.

FIG. 7A is a top view of a screen according to the present invention.

FIG. 7C is an end view of the screen of FIG. 7A.

FIG. 8A is a bottom view of part of a screen with cross strips according to the present invention.

FIG. 8B is an end view of part of the screen of FIG. 8A.

FIG. 8C is an end view of part of the screen of FIG. 8B.

FIG. 15A is a bottom view of a screen according to the present invention.

FIG. 15B is a side view of the screen of FIG. 15A.

DESCRIPTION OF EMBODIMENTS PREFERRED AT THE TIME OF FILING FOR THIS PATENT

Figure 1A:
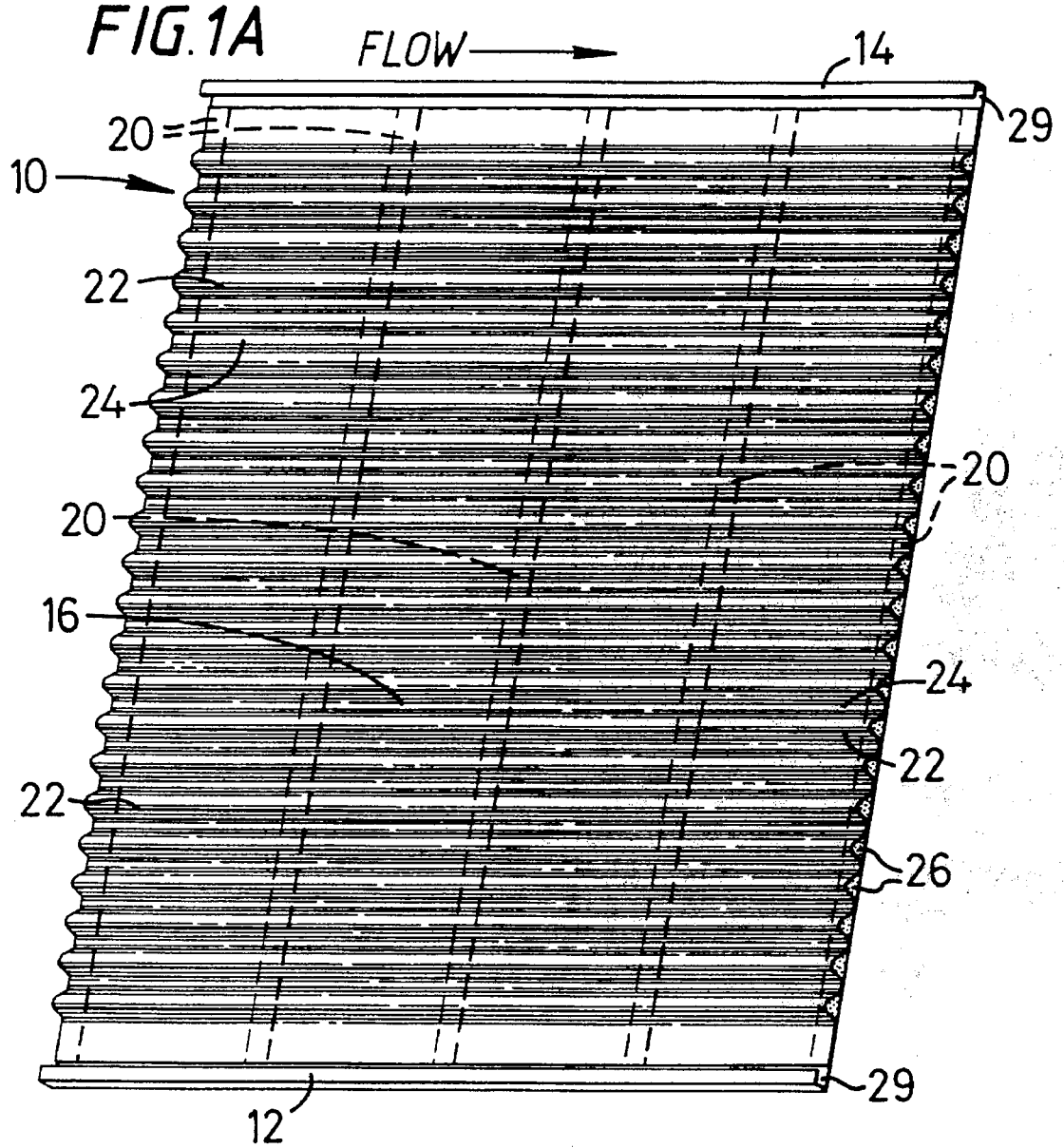
FIG. 1A is a perspective view of a screen according to the present invention.
Figure 1B:
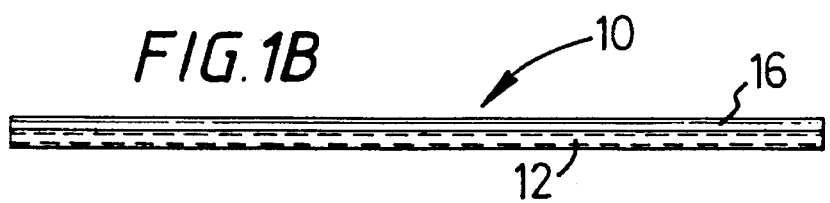
FIG. 1B is a side view of the screen of FIG. 1A.

FIG. 1A shows a screen 10 according to the present invention with a frame with two sides 12 and 14 with strips 20 extending between the two sides 12 and 14; and screen material 16 on the strips 20 and connected to the sides 12 and 14. Screen material 16 (and any other screen or screening material disclosed herein) represents any known mesh, screen, or screens, used in any combination, bonded together or unbonded. The screen material 16 as shown is "three-dimensional," i.e., not generally flat and has undulating portions with hills 22 (as seen in FIGS. 1A–1C) and valleys 24. (It is within the scope of this invention for the screening material 16 and any other screening material herein to be generally flat.)

Plugs 26 may plug ends of the hills 22. Incorporated fully herein by reference is the disclosure of co-owned pending U.S. application Ser. No. 08/282,983 filed on Jul. 29, 1994 entitled "Shale Shaker Screens" which discloses three-dimensional screens with plugged ends.

In the screen 10 each bottom part 28 of a valley 24 is glued with adhesive, e.g. but not limited to epoxy, to the cross strips 20 where the strips 20 run under the screen material 16. The frame sides 12 and 14 have, optionally, a hook portion 29 which facilitates screen mounting in certain shale shakers.

As shown in FIG. 1A the valleys 24 and hills 22 run generally parallel to the frame sides 12 and 14 and, when the screen 10 is mounted in a shale shaker, the direction of flow of drilling fluid (indicated by the arrow labelled "FLOW") is generally the same as the direction in which the valleys 24 and the hills 22 run.

Figure 2A:
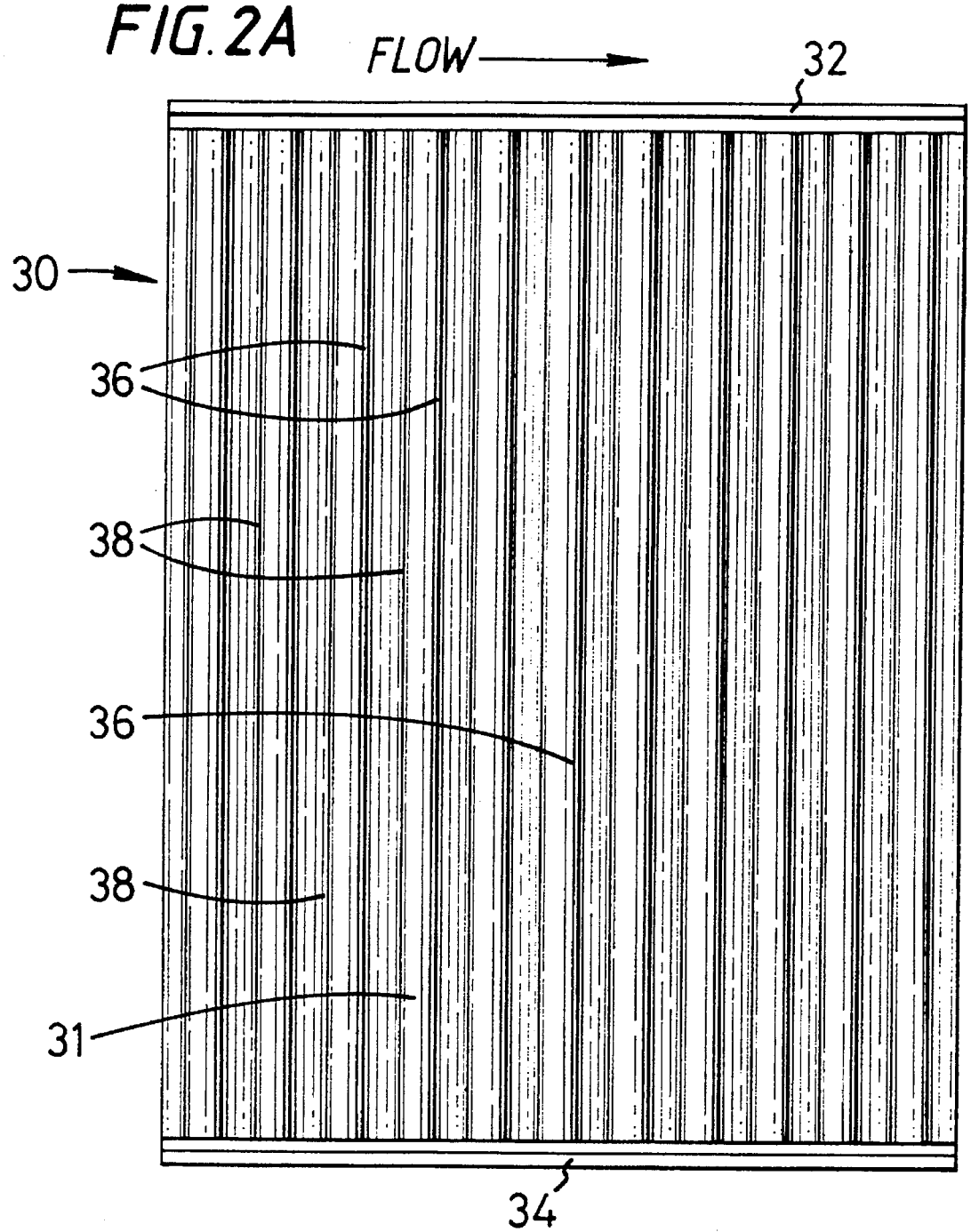
FIG. 2A is a top view of a screen according to the present invention.
Figure 2B:
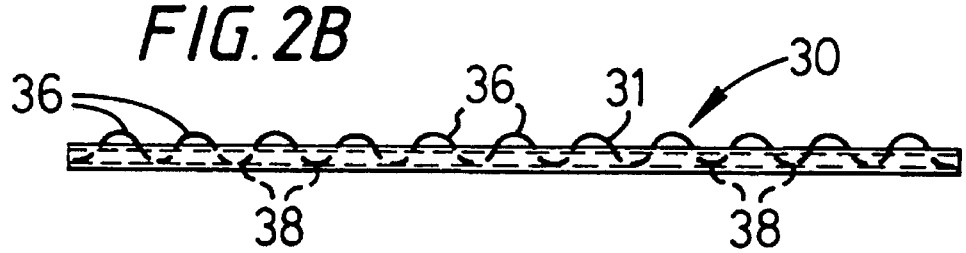
FIG. 2B is a side view of the screen of FIG. 2A.

FIG. 2A shows a screen 30 according to the present invention which as frame sides 32 and 34 between which is mounted undulating screen material 31. Any strip or strip combination disclosed herein may be used on the screen 30 below the screen material 31. The screen material 31 has hilltops 36 and valleys 38 which are generally perpendicular to the frame sides 32 and 34 and run across the screen 30 from one side 32 to the other side 34. When mounted on a shale shaker the direction of flow of drilling fluid across the screen 30 (as shown by the arrow labelled "FLOW") is at right angles to the general direction of the hills and valley. In one embodiment the strips are aligned with the direction of the valleys and, in another embodiment, there is a strip or rod under each valley. Instead of a strip or strips beneath the screen material 31, an apertured plate (which is not an equivalent of a rod or strip or of a series of strips) may be used.

FIGS. 3–6 show alternative configurations of bottom support strip combinations which may be used with any screen disclosed herein. The screening material may be any embodiment as disclosed herein. FIG. 3 shows an embodiment of a screen 40 with screening material 41 between frame sides 46 and 47 and a bottom support structure with cross strips 42 (like the previously described strips) and end strips 44 and 45 (which are like previously described strips but are at ends of the screening material 41).

FIG. 4 shows a screen 50 according to the present invention with screening material 51 between frame sides 52, 53, 54, and 55 and cross strips 56.

Figure 5:
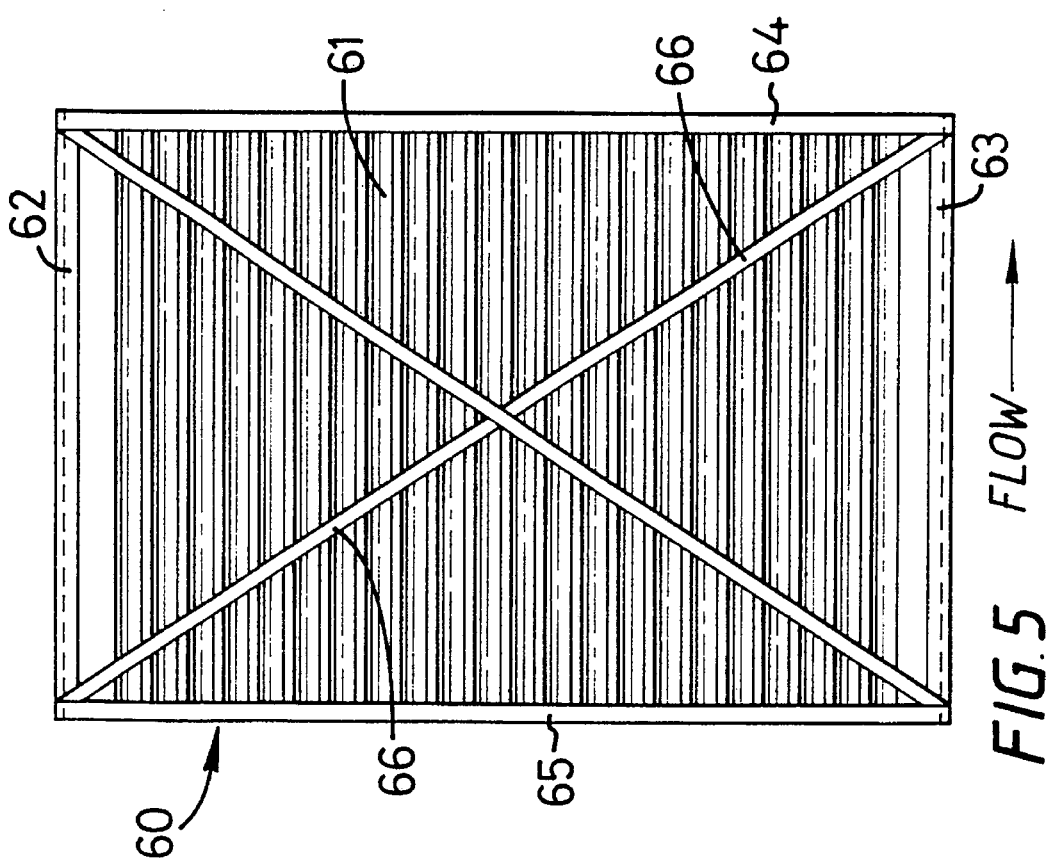
FIG. 5 is an bottom view of a screen according to the present invention.

FIG. 5 illustrates a screen 60 with screening material 61 between frame sides 62 and 63 with end strips 64 and 65 and diagonal cross strips 66. It is within the scope of this invention to use strips that are not full diagonals, but extend from any point on a first frame side to any point on a second frame side or strip which second frame side or strip is at a right angle to the first frame side.

Figure 6:
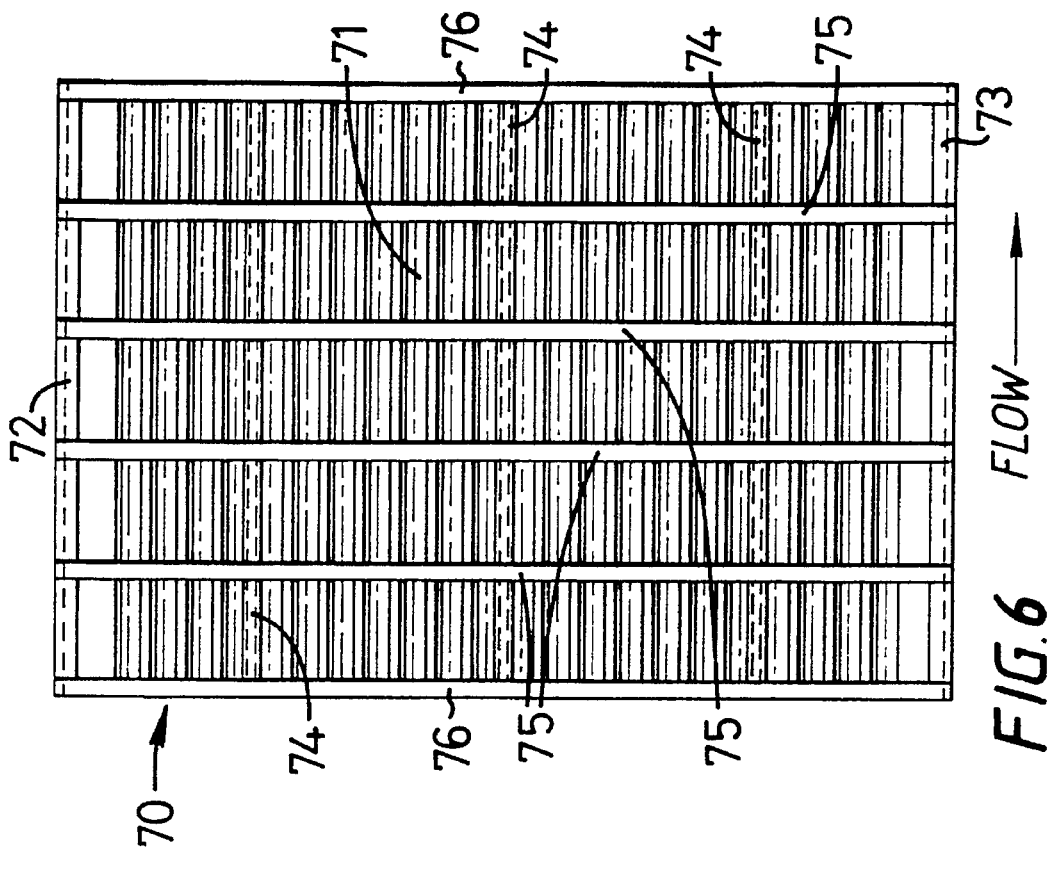
FIG. 6 is a bottom view of a screen according to the present invention.

FIG. 6 illustrates a screen 70 with screening material 71 between frame sides 72 and 73 with cross strips 74, cross strips 75 and end strips 76.

Figure 7B:
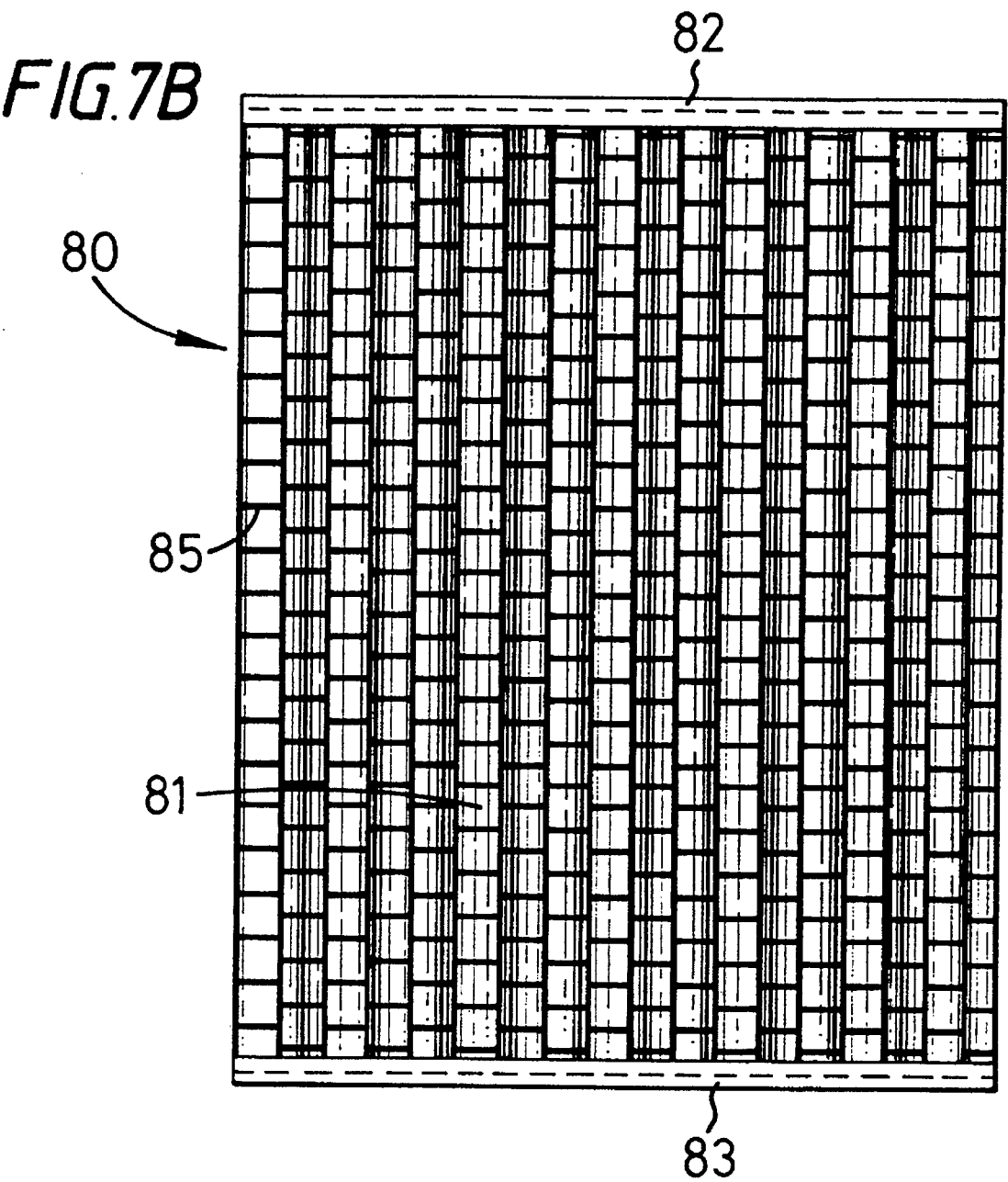
FIG. 7B is a bottom view of the screen of FIG. 7A.
Figure 7D:
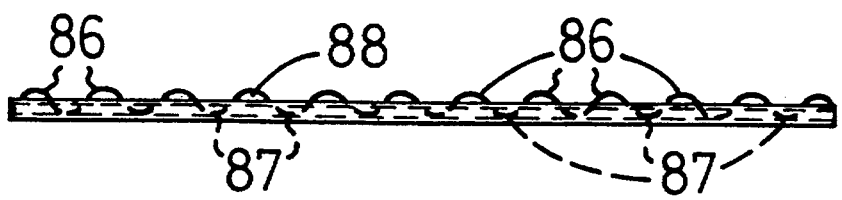
FIG. 7D is a side view of the screen of FIG. 7A.

FIG. 7A shows a screen 80 with frame sides 82 and 83 between which is secured screening material 81. The frame sides include hooks 84. A bottom support 85 is a rigid metal sheet with a plurality of openings therethrough. The screening material 81 is undulating with hilltops 86 and valleys 87. The screen 80 is emplaced in a shale shaker so that the direction of flow of drilling fluid across the screen (as shown by arrow labelled "FLOW") transverse to the general direction of the hills and valleys. A support strip or strips as disclosed herein may be used with this screen.

An opening 88 at the end of each undulating section of the screening material 81 may be closed off by initially applying an excess of screening material 81 so that a portion thereof extends beyond what will be the final outer boundary of the screening material. The excess portion is cut, folded back over the opening to close it off, and then secured in place with adhesive or welding.

FIG. 8A shows a bottom strip support assembly 90 for a screen according to the present invention. A plurality of strips 91 extend between and are secured to frame sides 92 and 93. As shown in FIG. 8B, a strip 91 is welded along a line 94 to a part of a screen hook 95. The weld is sized and configured to prevent leakage at the hook/strip interface. A sleeve 96 made of galvanized metal encases the hook for added strength and protection.

In certain embodiments of a screen as in FIG. 8A, the strips 91 are between one-thirty second and one-eighth inches thick and about forty-five and a half inches long; the frame sides 92, 93 are about thirty six inches long; the strips 91 are made from galvanized steel; the frame sides 92, 93 are made from 20 gauge galvanized steel; and the sleeve 96 is made from galvanized steel.

Figure 9:
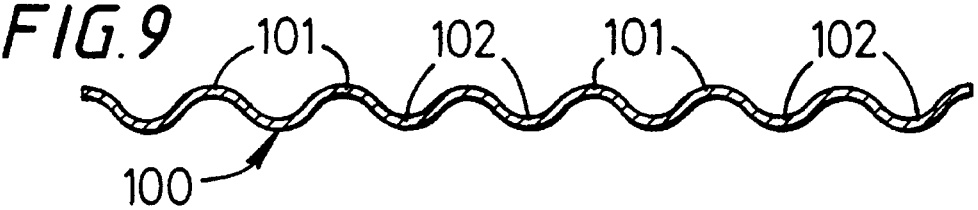
FIG. 9 is an end cross-sectional view of a strip for use in the present invention.

FIG. 9 illustrates a screen support strip 100 with hilltops 101 and valleys 102 for corresponding to similar hills and valleys in a screen or screening material to which the strip is applied.

Figure 10:
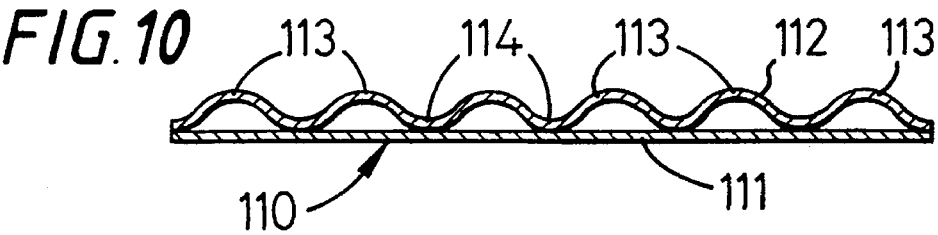
FIG. 10 is an end cross-sectional view of a strip for use in the present invention.

FIG. 10 illustrates a screen support strip 110 according to the present invention which has a bottom flat strip 111 and an undulating strip 112 fixed to the bottom flat strip 111. The undulating strip 112 has hilltops 113 and valleys 114 for corresponding to a screen or screening material with similar hills and valleys.

Figure 11:
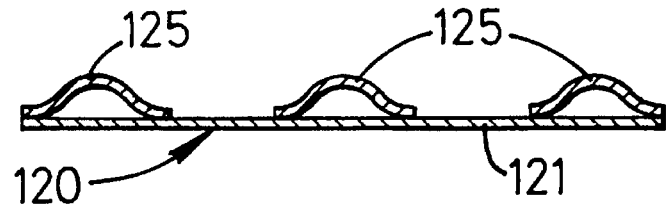
FIG. 11 is an end cross-sectional view of a strip for use in the present invention.

FIG. 11 illustrates a screen support strip 120 like the screen support strip 110, but with fewer projecting portions 125 so that when a screen with multiple troughs or indentations is supported by the strip 120, only every other trough or indentation in the screen (or screening material) will have a projecting portion 125 therein. It is within the scope of this invention to select any particular trough, plurality of troughs, or pattern of troughs or indentations to have a projection support portion therein. The screen support 120 has a lower strip 121 and the upper projecting portions 125, which may also be strips.

Figure 12:
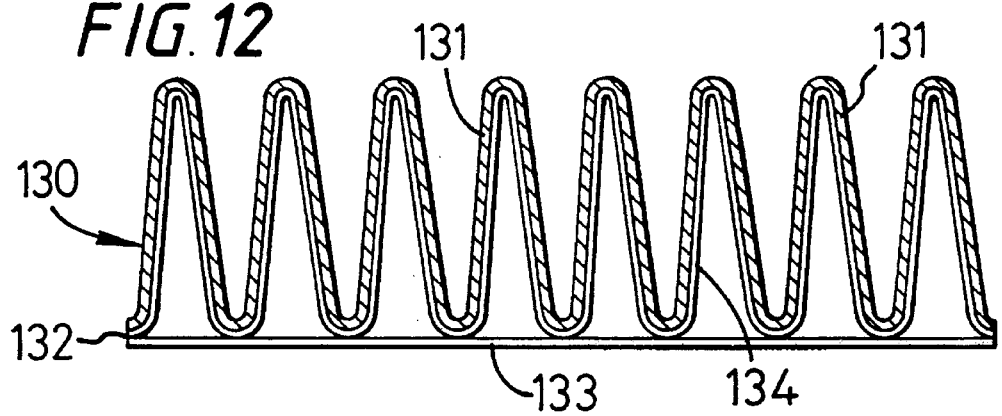
FIG. 12 is an end view of a screen according to the present invention.

FIG. 12 illustrates a screen 130 according to the present invention with screening material 131 (which may be any screen or screening material disclosed herein) supported by a support strip 132. The support strip 132 has a bottom strip 133 and an undulating strip 134 secured thereto. The screening material 131 may rest on the undulating strip 134 or some or all of the undulating strip 134 may be bonded to the screening material.

Figure 13:
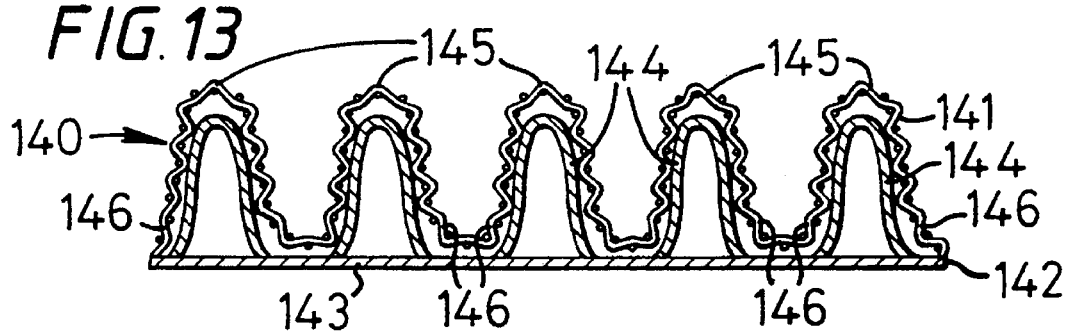
FIG. 13 is an end view of a screen according to the present invention.

FIG. 13 illustrates a screen 140 according to the present invention which has screening material 141 (which may be any screen or screening material disclosed herein) supported by a support strip 142. The support strip 142 has a lower strip 143 and projecting strip portions 144 secured to the lower strip 143. The projecting strip portions 144 project up into hills formed in the screening material 141. In any embodiment of this invention in which part of a support strip projects up into a raised part of a screen, the projecting strip may be connected to, adhesively bonded to, or welded to the screen at any selected point, line, points, or lines in the raised screen part. As shown in FIG. 13, the projecting strip portions are not bonded to, connected to or welded to the tops 145 of screening material 141; nor are they bonded to, welded to, or connected to lower portions 146 of the raised parts of the screening material 141. Alternatively the projecting strip portions 144 may be bonded to, connected to, or welded to only the tops 145 of the raised parts of the screening material; and/or to the lower portions 146.

Figure 14:
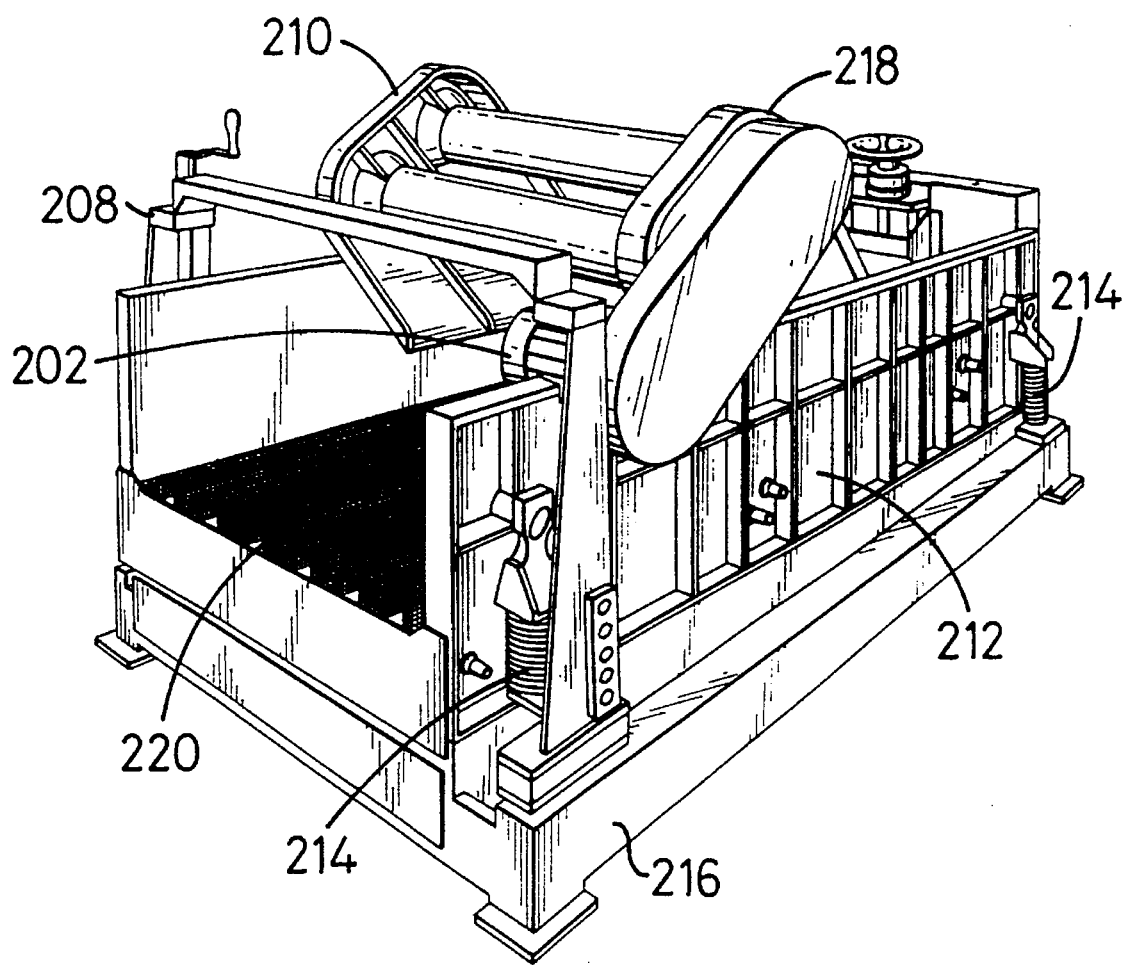
FIG. 14 is a perspective view of a shale shaker according to the present invention.

Referring now to FIG. 14, a shale shaker 210 according to the present invention has a screen 220 (with screen or screening cloth or mesh as desired) according to the present invention mounted on vibratable screen mounting apparatus or "basket" 212. The basket 212 is mounted on springs 214 (only two shown; two as shown are on the opposite side) which are supported from a frame 216. The basket 212 is vibrated by a motor 202 and interconnected vibrating apparatus 218 which is mounted on the basket 212 for vibrating the basket and the screens. Elevator apparatus 208 provides for raising and lowering of the basket end. The screen 220 may be any screen disclosed herein.

FIG. 15A shows a screen 250 like the screen in FIG. 1D, but without any frame sides. The screen 250 has a plurality of bottom support strips 252, each of which has two upper in-turned edges formed into a mounting hook 254. Undulating screening material 256 is bonded to the strips 252.

Figure 16A:
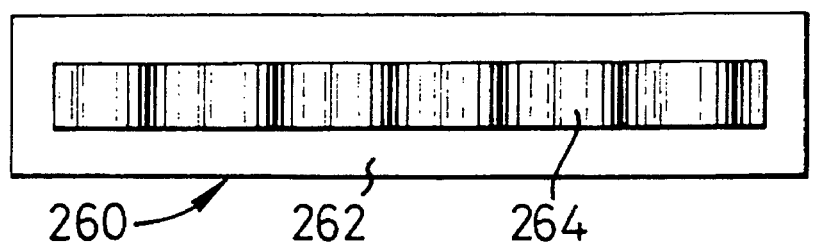
FIG. 16A is a top view of a support strip according to the present invention.
Figure 16B:
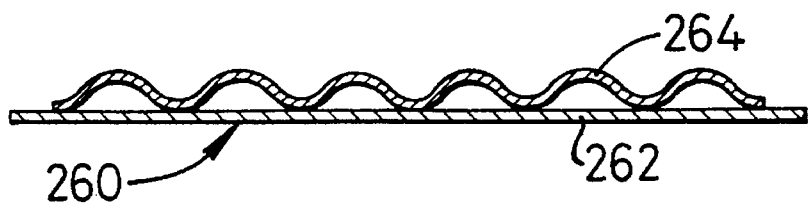
FIG. 16B is a side view of the support strip of FIG. 16A.

FIG. 16A shows a support strip 260 according to the present invention, with an upper projecting strip 264 secured to a lower strip 262. The upper projecting strip 264 is narrower in width than the lower strip 262. Any of the previously described strips with a projecting upper strip and a lower strip may have an upper strip that is narrower in width than the lower strip.

Figure 17A:
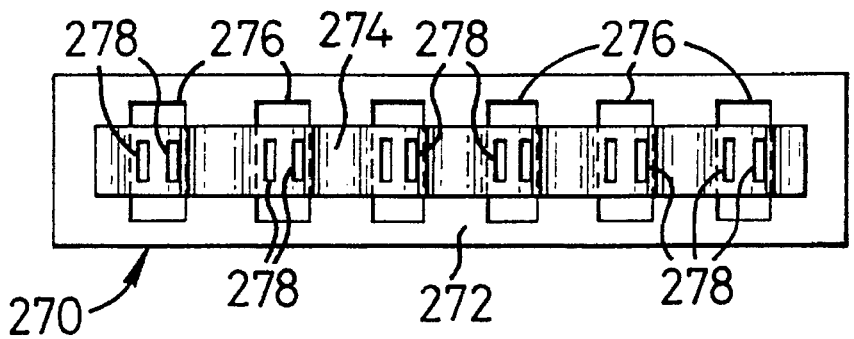
FIG. 17A is a top view of a support strip according to the present invention.
Figure 17B:
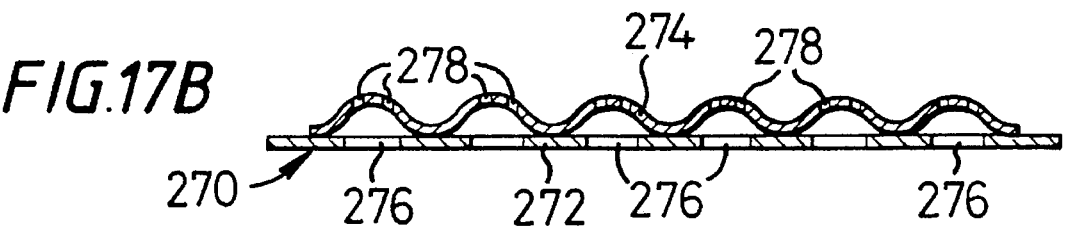
FIG. 17B is a side view of the support strip of FIG. 17A.

FIG. 17A discloses a support strip 270 with a lower strip 272 and an upper strip 274 secured to the lower strip 272. A series of openings 276 is provided through the lower strip 272 to facilitate fluid flow. A series of openings 278 is provided through the upper strip 274. Any strip or rod disclosed herein may have, in certain embodiments, holes therethrough to promote fluid flow. Any strip or rod disclosed herein with an upper projecting portion and a lower strip or rod may have holes in the upper strip or rod, the lower strip or rod, or both to promote fluid flow.

Figure 18:
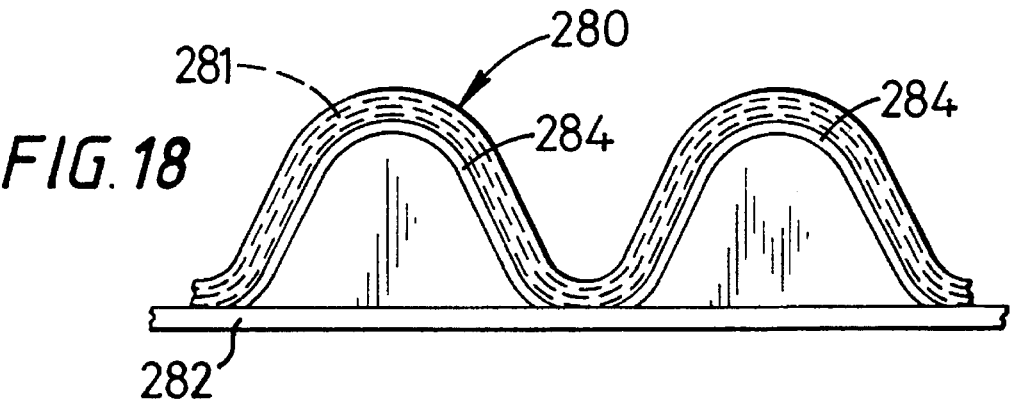
FIG. 18 is a side view of a screen according to the present invention.

FIG. 18 discloses an improvement to screens with upper screening material and a lower rigid perforated metal sheet or apertured plate, including but not limited to improvements for screens as disclosed in U.S. Pat. Nos. 5,417,793; 5,417,858; and 5,417,859. A screen 280 with screening material 281 has a lower apertured plate 282 (as disclosed, e.g., in the three listed patents). Upper projecting strips 284 are secured to the lower apertured plate 282. The upper projecting strips 284 may or may not be bonded to the screening material 281 and may or may not have holes therethrough. The screening material may be bonded to itself, and/or to any apertured plate, strip, or rod. Any upper projecting rod, strip, combination of strips or rods, or pattern of strips or rods disclosed herein may be used with screens with a lower apertured plate, including but not limited to those disclosed in the three listed patents.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A screen apparatus for a vibratory shaker device, the screen apparatus comprising screening material with an undulating shape with a series of raised portions, and at least one support strip beneath said screening material and in contact therewith, said at least one support strip between one half inch to three inches in width and between one thirty-second of an inch and one-eighth of an inch in thickness, and said at least one support strip having at least one raised part thereof with a shape corresponding to a shape of a raised portion of the screening material, said at least one raised part positioned beneath and supporting said raised portion.

2. The screen apparatus of claim 1 wherein
said at least one raised part of said at least one support strip is a plurality of raised parts, each raised part with a shape corresponding to a shape of a raised portion of the screening material, each raised part positioned beneath and supporting a raised portion of the screening material.

3. The screen apparatus of claim 2 wherein one raised part is positioned beneath and supports each raised portion of the screening material.

4. The screen apparatus of claim 1 wherein the screening material comprises a plurality of screens one on top of the other.

5. The screen apparatus of claim 4 wherein the screens are adhesively bonded to each other.

6. The screen apparatus of claims 1 wherein the at least one support strip has a plurality of holes therethrough.

7. The screen apparatus of claim 1 further comprising
a base strip for each of the at least one support strip,
each of the at least one support strip positioned on a corresponding base strip.

8. The screen apparatus of claim 7 wherein each base strip has base strip holes therethrough.

9. The screen apparatus of claims 8 wherein the at least one support strip has support strip holes therethrough.

10. The screen apparatus of claim 1 wherein
each raised portion of screening material has an inner surface with a top inner surface, and a bottom inner surface, and
the at least one raised part of the at least one support strip contacts only the top inner surface of the raised portion.

11. The screen apparatus of claim 1 wherein
each raised portion of screening material has an inner surface, and
the at least one raised part of the at least one support strip has a length and contacts the inner surface of the raised portion of the screening material along substantially all of the length of the at least one raised part.

12. The screen apparatus of claim 1 further comprising
an apertured plate beneath the screening material, and
said at least one support strip on said apertured plate.

13. The screen apparatus of claim 1 wherein the undulating shapes of the screening material form a series of generally parallel hills and valleys running generally in a first direction and the screen apparatus is positioned on the vibratory shaker device so that material flows in a second direction generally perpendicular to the first direction over the screen apparatus.

14. A screen apparatus for a vibratory shaker device, the screen apparatus comprising
screening material with an undulating shape with a series of raised portions,
a plurality of support strips beneath said screening material and in contact therewith,
each support strip having a plurality of raised parts thereof each with a shape corresponding to a shape of a raised portion of the screening material, each of said raised parts positioned beneath and supporting a raised portion of the screening material, each raised portion of the screening material positioned above and supported by a raised part of a support strip, said at least one support strip between one half inch to three inches in width and between one thirty-second of an inch and one-eighth of an inch in thickness,
a plurality of base strips, one base strip for each support strip,
each of the support strips positioned on a corresponding base strip,
each base strip having a plurality of base strip holes therethrough, and
each support strip having a plurality of support strip holes therethrough.

15. The screen apparatus of claim 14 wherein the undulating shapes of the screening material form a series of generally parallel hills and valleys running generally in a first direction and the screen apparatus is positioned on the vibratory shaker device so that material flows generally in the first direction over the screen apparatus.

16. The screen apparatus of claim 14 wherein the undulating shapes of the screening material form a series of generally parallel hills and valleys running generally in a first direction and the screen apparatus is positioned on the vibratory shaker device so that material flows in a second direction generally perpendicular to the first direction over the screen apparatus.

17. A separatory apparatus comprising
a vibratory shaker device,
a screen apparatus mounted on the vibratory shaker device and comprising
screening material with an undulating shape with a series of raised portions, and
at least one support strip beneath said screening material and in contact therewith, said at least one support strip between one half inch to three inches in width and between one thirty-second of an inch and one-eighth of an inch in thickness,
said at least one support strip having at least one raised part thereof with a shape corresponding to a shape of a raised portion of the screening material, said at least one part positioned beneath and supporting said raised portion,
the undulating shapes of the screening material forming a series of generally parallel hills and valleys running generally in a first direction and the screen apparatus positioned on the vibratory shaker device so that material flows in a second direction generally perpendicular to the first direction over the screen apparatus.

18. A screen apparatus for a vibratory shaker device, the screen apparatus comprising
screening material with an undulating shape with a series of raised portions, and
at least one support strip beneath said screening material and in contact therewith,
said at least one support strip having at least one raised part thereof with a shape corresponding to a shape of a raised portion of the screening material, said at least one raised part positioned beneath and supporting said raised portion,
a base strip for each of the at least one support strip, each base strip with base strip holes therethrough,
each of the at least one support strip positioned on a corresponding base strip, and
a raised part of a support strip overlying each hole in each base strip.

19. The screen apparatus of claim 18 wherein each hole in each base strip is wider than each support strip.

* * * * *